United States Patent
Yamauchi et al.

(10) Patent No.: US 7,632,329 B2
(45) Date of Patent: Dec. 15, 2009

(54) METHOD OF REFINING SCRAP SILICON USING AN ELECTRON BEAM

(75) Inventors: Norichika Yamauchi, Ichihara (JP); Takehiko Shimada, Yokohama (JP)

(73) Assignee: IIS Materials Corporation, Ltd., Tokyo (JP)

( * ) Notice: Subject to any disclaimer, the term of this patent is extended or adjusted under 35 U.S.C. 154(b) by 520 days.

(21) Appl. No.: 11/142,679

(22) Filed: Jun. 2, 2005

(65) Prior Publication Data

US 2006/0016290 A1 Jan. 26, 2006

(30) Foreign Application Priority Data

Jun. 3, 2004 (JP) .............................. 2004-194724

(51) Int. Cl.
C22B 9/22 (2006.01)
C21B 11/10 (2006.01)
C21B 13/12 (2006.01)
C21C 5/52 (2006.01)
C21C 5/54 (2006.01)
C22B 4/00 (2006.01)

(52) U.S. Cl. ....................................... 75/10.13; 75/10.1

(58) Field of Classification Search ................. 75/10.13, 75/10.1, 10.29, 10.64, 10.65; 423/348
See application file for complete search history.

(56) References Cited

U.S. PATENT DOCUMENTS 4,049,123 A * 9/1977 Fegley et al. ................. 209/555
6,231,826 B1 * 5/2001 Hanazawa et al. ........... 423/348

FOREIGN PATENT DOCUMENTS

JP 10245216 9/1998

* cited by examiner

Primary Examiner—George Wyszomierski
Assistant Examiner—Vanessa Velasquez
(74) Attorney, Agent, or Firm—Michael Tobias

(57) ABSTRACT

A method of refining scrap silicon using an electron beam includes a step of selectively preparing lumps of n-type scrap silicon containing a specific impurity element as a dopant, a step of crushing the prepared lumps of scrap silicon, a step of placing the crushed silicon into a vacuum vessel, a step of irradiating the crushed silicon which was placed into the vacuum vessel with an electron beam to melt it and vaporize at least a portion of the impurity element, and a step of solidifying the resulting silicon.

6 Claims, 4 Drawing Sheets

METHOD OF REFINING SCRAP SILICON USING AN ELECTRON BEAM

BACKGROUND OF THE INVENTION

This invention relates to a method which can refine scrap silicon rapidly and in large quantities using an electron beam to obtain high-purity silicon suitable for solar cells, semiconductors, and similar devices.

In order to increase the rate of utilization of silicon raw materials, it is desired to reutilize scrap which is produced during the manufacture of silicon wafers from silicon ingots (referred to below as "scrap silicon"). However, scrap silicon contains impurities, so it is necessary to increase its purity before it can be reused.

Japanese Published Unexamined Patent Application Hei 10-245216 discloses that the yield of silicon can be increased by recovering scrap silicon which is produced during the manufacture of silicon for solar cells and returning the recovered scrap silicon to a refining step.

However, that document merely discloses a technique for improving the yield of silicon in the manufacture of silicon for solar cells. Lumps of scrap silicon from different sources may contain a variety of different impurity elements, such as boron, phosphorous, arsenic, and antimony. Depending upon the type of impurity element, some lumps cannot be refined using an electron beam, while there are lumps for which refining with an electron beam is possible but is nevertheless impractical from the standpoints of refining time and refining costs. In addition, when lumps of scrap silicon containing different impurity elements are mixed together during the melting stage of a refining process, high-purity silicon is not obtained. Furthermore, if scrap silicon contains impurity elements which cannot be removed adequately or at all by melting, the impurity elements end up remaining in the silicon after refining, and high-purity silicon is not obtained.

SUMMARY OF THE INVENTION

In light of the above, an object of the present invention is to provide a refining method for scrap silicon using an electron beam which is suitable for recycling of scrap silicon which is produced during the manufacture of silicon products such as silicon wafers.

According to one form of the present invention, a refining method for scrap silicon using an electron beam which is capable of achieving the above-described object includes (a) a step of selectively preparing lumps of n-type scrap silicon containing a specific impurity element as a dopant, (b) a step of crushing the prepared lumps of scrap silicon, (c) a step of placing the crushed silicon into a vacuum vessel, (d) a step of irradiating the crushed silicon which was placed into the vacuum vessel with an electron beam to melt the crushed silicon and vaporize at least a portion of the specific impurity element, and (e) a step of solidifying the molten silicon which was obtained.

Alternatively, the refining method includes (a) a step of selectively preparing lumps of n-type scrap silicon containing a specific impurity element as a dopant, (b) a step of crushing the prepared lumps of scrap silicon to obtain granular silicon, (c) a step of placing the granular silicon in a holding portion provided in a vacuum vessel, (d) a step of supplying a portion of the granular silicon in the holding portion to a hearth provided in the vacuum vessel, irradiating the granular silicon within the hearth with an electron beam to melt the granular silicon and obtain molten silicon from which at least a portion of the specific impurity element has been vaporized, (e) a step of transferring the molten silicon to a crucible provided in the vacuum vessel, (f) a step of repeating steps (d) and (e) a prescribed number of times, and (g) a step of solidifying the molten silicon in the crucible.

The extent to which the specific impurity element is vaporized is determined on the basis of the required purity of silicon to be produced. For example, when the produced silicon is used as a material for solar cells, the level of vaporization is determined such that the produced silicon has a purity of 99.999%, which however varies depending on the type of the impurity element contained as a dopant.

The impurity element in the scrap silicon is preferably phosphorous, arsenic, or antimony. Phosphorous, arsenic, and antimony have a high vapor pressure in a vacuum, so they can be removed relatively easily in a short period of time by the refining method of the present invention, and high-purity product silicon can be efficiently manufactured.

The step of selectively preparing lumps of scrap silicon may be a step of purchasing lumps of n-type scrap silicon containing the specific impurity element as a dopant, or it may be a step of selecting lumps of n-type scrap silicon containing the specific impurity element as a dopant from purchased lumps of scrap silicon. In the former case, the preparation step includes a step of measuring the electrical resistivity of the purchased lumps of scrap silicon, a step of determining whether or not the purchased lumps of scrap silicon contain the specific impurity element as a dopant based on the measured electrical resistivity, and a step of not further employing the purchased lumps of scrap silicon in the method when they are not lumps of scrap silicon containing the specific impurity element as a dopant. It is not necessary to carry out the determination of whether the lumps contain the specific impurity element as a dopant on all the lumps of scrap silicon, and it is sufficient to perform this determination by sampling a portion of the purchased lumps. In the latter case, the preparation step includes a step of measuring the electrical resistivity of the purchased lumps of scrap silicon and a step of selecting lumps of n-type scrap silicon containing the specific impurity element as a dopant based on the measured resistivity.

In silicon which is presently manufactured, the electrical resistivity of lumps of scrap silicon varies depending on the type of impurity elements contained therein. Based on this fact, the present inventors conceived of ascertaining whether purchased lumps of scrap silicon contain a specific impurity element as a dopant based on the electrical resistivity of the lumps of scrap silicon and of selecting from purchased lumps of scrap silicon only those containing the specific impurity element, and they thereby completed the present invention.

A refining method according to the present invention preferably further includes the step of measuring the electrical resistivity of the lumps of silicon obtained in the solidification step and ascertaining based on the measured electrical resistivity whether the lumps of scrap silicon used in refining are lumps of n-type scrap silicon containing the specific impurity element as a dopant. Depending on the composition of the scrap silicon, a lump of scrap silicon may contain an impurity element different from the specific one even when the electrical resistivity of the lump is the electrical resistivity corresponding to the specific impurity element. In such a case, if refining is carried out to remove the specific impurity element, the impurity element other than the specific one cannot be removed significantly or at all, and high-purity product silicon cannot be obtained. In the present invention, the electrical resistivity of lumps of silicon obtained in the solidification step may be measured, and based on the measured electrical resistivity, it can be ascertained whether the lumps of scrap silicon used in refining are lumps of n-type scrap silicon containing the specific impurity element as a dopant, so the above-described problem does not occur. When scrap silicon containing a specific impurity element is purchased from a specific manufacturer, it is not necessary to perform the above-described ascertaining step with respect to all of the product silicon, and it is sufficient to refine a portion of all the purchased scrap silicon to manufacture product silicon and to carry out the above-described ascertaining step on the product silicon manufactured from the portion.

In a refining method for scrap silicon using an electron beam according to the present invention, lumps of n-type scrap silicon containing a specific impurity element as a dopant are selectively prepared, the prepared lumps of scrap silicon are crushed, the crushed silicon is irradiated with an electron beam in a vacuum vessel and melted and at least a portion of the impurity element is vaporized, and the resulting molten silicon is solidified. Therefore, high-purity silicon can be manufactured from scrap silicon in a short period of time and with good efficiency. In addition, if a step of supplying a portion of the granular silicon in a holding portion of a vacuum vessel to a hearth provided in the vacuum vessel and irradiating the granular silicon in the hearth with an electron beam to melt it and obtaining molten silicon from which at least a portion of an impurity element was vaporized, a step of transferring the molten silicon to a crucible provided in the vacuum vessel, and a step of irradiating the molten silicon which was transferred to the crucible with an electron beam to further vaporize the specific impurity element are repeated a prescribed number of times, refining operation can be continuously carried out and refining of silicon can be efficiently performed.

DESCRIPTION OF THE PREFERRED EMBODIMENTS

Below, an embodiment of a refining method for scrap silicon using an electron beam according to the present invention will be described while referring to the accompanying drawings.

Figure 1:
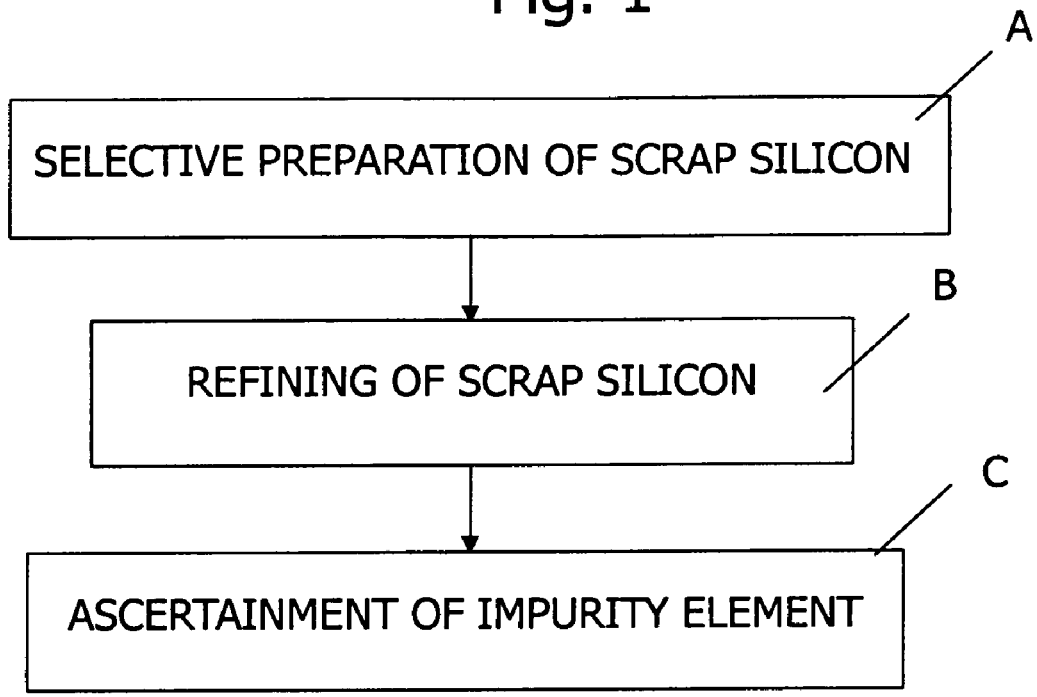
FIG. 1 is a flow chart of the steps in an embodiment of a refining method for scrap silicon according to the present invention.
Figure 2:
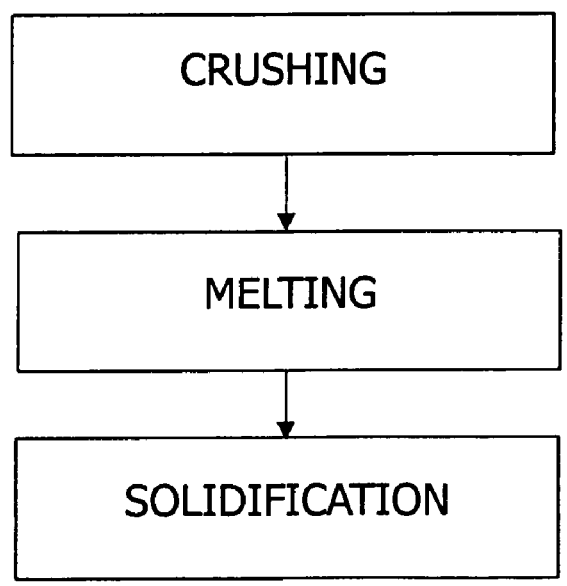
FIG. 2 is a flow chart showing the details of the refining step of FIG. 1.

As shown in FIG. 1, this embodiment of a method of refining scrap silicon using an electron beam according to the present invention includes Step A of selectively preparing lumps of n-type scrap silicon containing a specific impurity element as a dopant, Step B of refining the scrap silicon to manufacture product silicon, and Step C of analyzing the manufactured product silicon and again ascertaining whether the prepared lumps of scrap silicon contained the specific impurity element as a dopant. These steps will be described in detail below.

Step A (Preparation Step)

First, lumps of n-type scrap silicon containing a specific impurity element as a dopant, such as lumps of n-type scrap silicon containing antimony as a dopant, are selectively prepared. Namely, lumps of n-type scrap silicon containing antimony as a dopant are purchased, or lumps of n-type scrap silicon containing antimony as a dopant are selected from purchased lumps of scrap silicon containing various impurity elements.

When lumps of n-type scrap silicon each containing antimony as a dopant are purchased, the electrical resistivity of a number of samples selected from the purchased lumps of scrap silicon is measured, and based on the measured electrical resistivity, it is ascertained whether the purchased lumps of scrap silicon contain only antimony. In currently manufactured silicon, the electrical resistivity of n-type scrap silicon containing arsenic as a dopant is less than 5 milliohm-cm, the electrical resistivity of n-type scrap silicon containing antimony as a dopant is 5 milliohm-cm to 30 milliohm-cm, and the electrical resistivity of n-type scrap silicon containing phosphorous as a dopant is 0.1 ohm-cm to 1 ohm-cm, so the electrical resistivity significantly varies depending upon the impurity, and it can be determined with certainty whether purchased scrap silicon contains antimony.

When lumps of n-type scrap silicon containing antimony as a dopant are selected from a mixture of purchased lumps of scrap silicon containing various impurity elements, the electrical resistivity of each silicon lump is measured, and based on the measurement, lumps of n-type scrap silicon containing antimony as a dopant are selected.

Step B (Refining Step)

In this step, the lumps of scrap silicon which were prepared in Step A are pulverized and melted to refine them. This step will be described in further detail later on.

Step C (Impurity Ascertaining Step)

The purity and electrical resistivity of the refined silicon are simultaneously measured. Based on the measured electrical resistivity, it is again ascertained whether the scrap silicon which was used contained the specific impurity element as a dopant. For example, it is ascertained whether the scrap silicon which was used contained antimony or arsenic as a dopant. In this case, when the electrical resistivity of the refined silicon is smaller than a prescribed value, it is determined that the scrap silicon which was used contained an impurity element other than antimony or arsenic, such as phosphorous. When it is determined that the scrap silicon which was used contained an impurity element other than antimony or arsenic, the refining conditions are changed.

The refining step (Step B) comprises a crushing step, a melting step, and a solidification step. These steps will be described below in sequence.

Crushing Step

Figure 3:
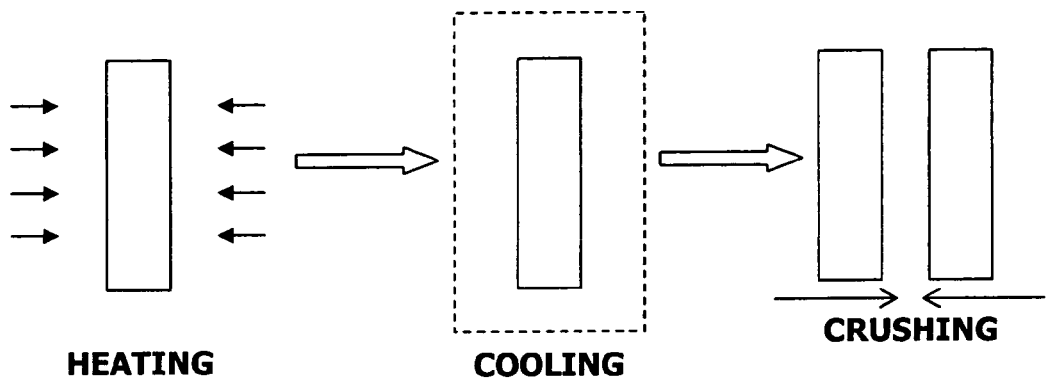
FIG. 3 is a flow chart showing the details of the crushing step of FIG. 2.

In this step, scrap silicon which was prepared in Step A (referred to below as "raw material silicon") is crushed to a size suitable for the subsequent melting step. FIG. 3 shows the details of the crushing step. First, the raw material silicon is heated by a method such gas burner heating, electric furnace heating, or high-frequency heating, and then it is rapidly cooled by water cooling or air cooling. Of the above-described heating methods, it is particularly preferable to use high-frequency heating because it can prevent contamination during heating and uses relatively simple equipment. Heating of the raw material silicon is carried out on refractory bricks or silicon oxide in order to prevent adhesion of metallic impurities to the raw material silicon. As a result of the above-described heating and cooling steps, the raw material silicon becomes brittle and easy to crush. Pieces of the raw material silicon are then struck against each other and crushed. When this crushing is carried out by hand, pieces of the raw material silicon are held in both hands above a tray made of a plastic such as polyethylene and are crushed by being struck against each other. The crushed raw material silicon (referred to below as "granular scrap silicon") is collected in the tray. Since the tray is made of plastic, it does not contain any metallic impurities which could adhere to the granular scrap silicon during crushing. This crushing step may also be carried out by a crusher which performs the same operation as that performed by manual crushing. An example of a suitable method of performing crushing is disclosed in U.S. patent application Ser. No. 10/954,350 entitled "Method of Crushing Silicon Blocks", the disclosure of which is incorporated by reference.

Melting Step

The granular scrap silicon which is obtained in the above-described crushing step is placed into a hearth disposed inside a vacuum vessel reduced to a pressure of $10^{-4}$ torr or less, for example. The granular scrap silicon is then irradiated with an electron beam to melt it and obtain molten silicon heated to a temperature of at least 1500° C., for example, (referred to below as "a melt"). The melt is then transferred to a water-cooled crucible disposed in the vacuum vessel adjoining the hearth. Preferably, after a prescribed amount of the granular silicon is placed into a holding portion provided in the vacuum vessel, (a) a step of supplying a portion of the granular silicon in the holding portion to a hearth provided inside the vacuum vessel, irradiating the granular silicon in the hearth with an electron beam to melt it, and obtaining molten silicon from which at least a portion of the specific impurity element was vaporized, (b) a step of transferring the molten silicon to a crucible provided in the vacuum vessel, and optionally (c) a step of irradiating the molten silicon which was transferred to the crucible with an electron beam to further vaporize the specific impurity element are repeated a prescribed number of times. When the required purity of silicon is low, step (c) may be omitted.

Solidification Step

The molten silicon in the crucible is cooled. In a water-cooled crucible, a silicon melt undergoes directional solidification, and heavy metals contained in the raw material silicon or heavy metals mixed in during the above-described steps are removed by segregation.

Next, an example of a refining apparatus which can be used to perform a method of refining scrap silicon according to the present invention will be described while referring to FIGS. 4-7.

Figure 4:
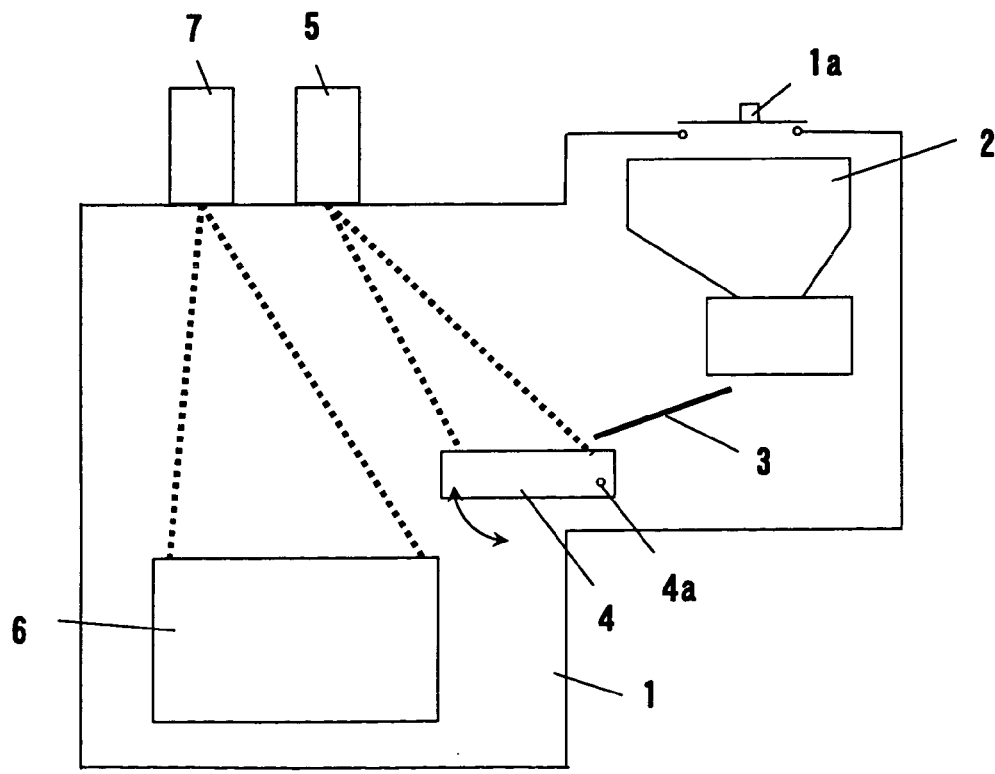
FIG. 4 is a schematic view showing the overall structure of an embodiment of a refining apparatus which can be used in the present invention.

As shown in FIG. 4, this refining apparatus includes a vacuum vessel (vacuum chamber) 1, a raw material supply apparatus 2 disposed in the vacuum vessel 1, a hearth 4 which is disposed in the vacuum vessel 1 and receives granular scrap silicon which is supplied by the raw material supply apparatus 2 via a chute 3, an electron gun 5 which irradiates the granular scrap silicon in the hearth 4 with an electron beam and melts it, a crucible 6 to which a melt is supplied from the hearth 4, and an electron gun 7 which irradiates the melt in the crucible 6 with an electron beam.

Figure 5:
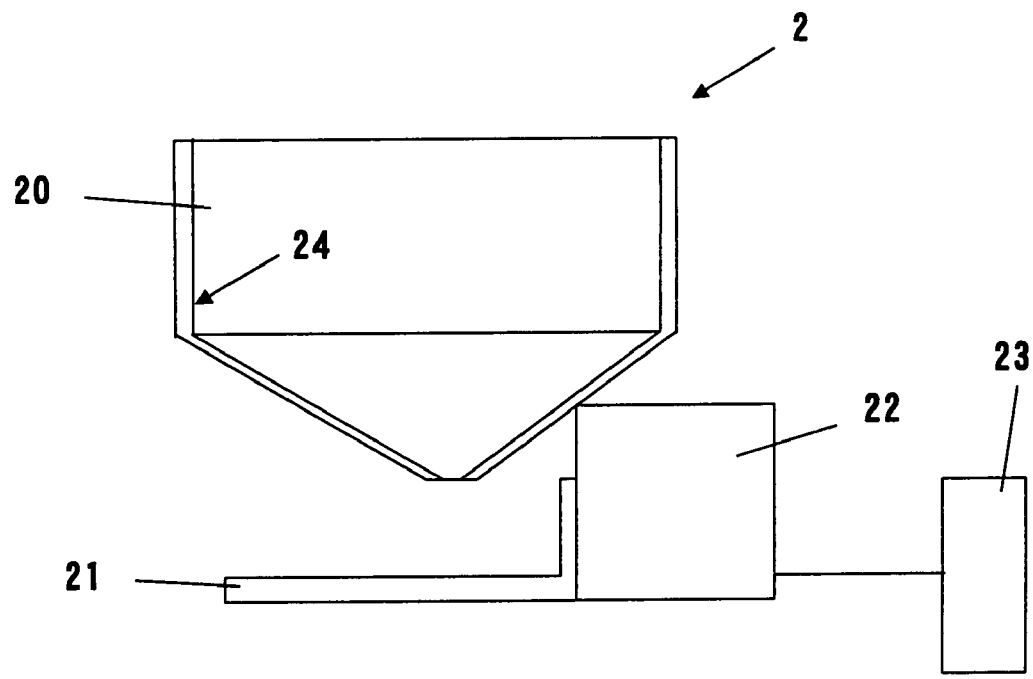
FIG. 5 is a schematic view illustrating the structure of the raw material supply apparatus shown in FIG. 4.

The vacuum vessel 1 is connected to an unillustrated vacuum pump. In its upper portion, the vacuum vessel 1 is equipped with a removable sealing lid 1a which hermetically seals an opening through which a raw material in the form of granular scrap silicon can be supplied to the material supply apparatus 2 from the exterior of the vacuum vessel 1. The raw material supply apparatus 2 comprises a commercially available vibratory parts feeder (e.g., a JA-type bulk hopper of SANKI Co., Ltd.) modified for use in a high-temperature vacuum. The modifications include, for example, replacement of parts made of iron with parts made of stainless steel in order to prevent formation of rust in the high-temperature vacuum, and replacement of ordinary grease with grease for use in a vacuum. As shown in FIG. 5, the raw material supply apparatus includes a metal hopper 20 which functions as a raw material holding portion, a raw material moving portion 21 which by vibrating moves granular scrap silicon to a horizontal position corresponding to the upper end of the chute 3 and then drops it onto the chute 3, a drive portion 22 which imparts prescribed vibrations to the raw material moving portion 21, and a controller 23 which controls the drive portion 22 and is installed outside the vacuum vessel 1. The supply speed of the granular scrap silicon can be changed by inputting a command to the controller 23 and controlling the magnitude of the vibrations. A coating 24 of a plastic such as polyethylene is provided on those portions of the inner peripheral surface of the hopper 20 which could be contacted by granular scrap silicon in the absence of a coating. In addition, the raw material moving portion 21 is made of plastic. As a result, granular scrap silicon does not come into contact with metal surfaces in the hopper 20 or the raw material moving portion 21, and metallic impurities can be prevented from adhering to the granular scrap silicon in the hopper 20 or the raw material moving portion 21.

Figure 6:
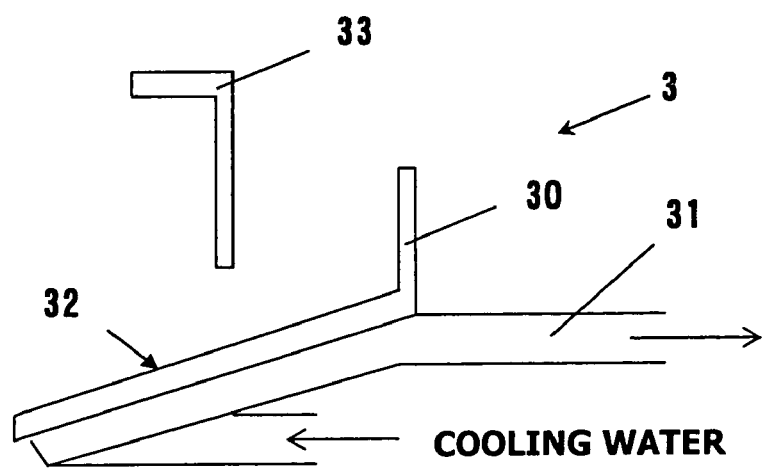
FIG. 6 is a schematic view illustrating the structure of the chute shown in FIG. 4.

As shown in FIG. 6, the chute 3 includes a chute body 30 which is made of copper and which is sloped at an angle of approximately 15-60° with respect to the horizontal in order to guide granular scrap silicon which falls onto the chute 3 from the raw material supply apparatus 2 to the hearth 4. The chute 3 also includes a cooling water pipe 31 which cools the chute body 30 and mitigates the effect of radiated heat from the silicon which is melted in the hearth 4. A silicon lining 32 is provided on the top surface of the chute body 30 where it would be directly contacted by the granular silicon to prevent impurities from the chute body 30 being mixed into granular silicon. In this embodiment, the chute body 30 has an upper surface and an unillustrated pair of side walls, and a silicon plate which is cut from a high-purity silicon ingot is provided on the top surface and the inner surfaces of the side walls as the silicon lining 32. A radiation partition (separator) 33 is provided above the chute 3 to shield the raw material supply apparatus 2 from thermal radiation from the hearth 4 and to prevent a portion of the scrap silicon or fragments thereof from flying from the raw material supply apparatus 2 into the crucible 6.

Although not shown in the drawings, the hearth 4 has a recess in its upper portion for receiving granular scrap silicon and a pouring opening through which molten silicon can be poured into the crucible 6. The hearth 4 is supported so as to be able to swing up and down about a pivot axis 4a. When molten silicon is poured from the hearth 4 into the crucible 6, the hearth 4 can be tilted by an unillustrated actuator so that its left side (the side adjoining the crucible 6) in FIG. 4 is lowered.

Figure 7:
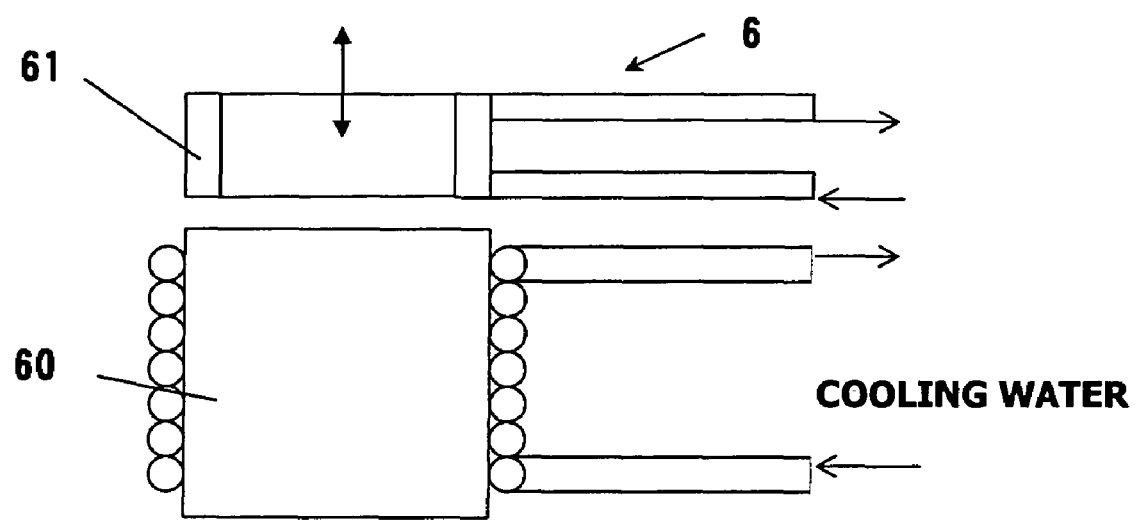
FIG. 7 is a schematic view illustrating the structure of the crucible shown in FIG. 4.

As shown in FIG. 7, the crucible 6 includes a water-cooled crucible body 60 made of copper and a water-cooled cold trap 61 installed above the crucible body 60. The cold trap 61, which is made of copper, for example, captures impurities which are vaporized from the melt in the crucible body 60 by irradiation with an electron beam. The cold trap 61 is preferably supported so as to be able to move up and down with respect to the crucible body 60 so as to change its height in accordance with the amount of molten silicon in the crucible body 60, whereby the rate of capture of impurity elements which are vaporized can be increased.

Next, the operation of the above-described example of a refining apparatus will be described. First, lumps of scrap silicon are pulverized to form granular scrap silicon. The lid 1a of the vacuum vessel 1 is opened, and the hopper 20 of the raw material supply apparatus 2 is filled with granular scrap silicon. The lid 1a is then closed, and a vacuum of a prescribed level is created inside the vacuum vessel 1. The raw material supply apparatus 2 is then operated, and the granular scrap silicon inside the hopper is discharged onto the chute 3 at a prescribed speed and is supplied to the hearth 4 by the chute 3. When a prescribed amount of granular scrap silicon has been supplied to the hearth 4, electron gun 5 is operated and an electron beam irradiates the granular scrap silicon within the hearth 4 and melts it to obtain a melt having a prescribed temperature.

When the melting is completed, the hearth 4 is tilted, and molten silicon is poured from the hearth 4 into the crucible body 60. Before the melt in the crucible 6 solidifies, electron gun 7 positioned above the crucible 6 is operated to irradiate the melt in the crucible 6 with an electron beam and further vaporize the impurity element contained in the melt. The above-described operation is repeated until the melt in the crucible 6 reaches a prescribed level. Then, the crucible 6 is cooled and the melt is solidified. At this time, directional solidification of the silicon melt occurs, and heavy metals contained in the raw material silicon are removed by segregation. Specifically, during the solidification, heavy metals move to the liquid phase, and at the end of the solidification, the heavy metals solidify in an end portion of a resulting lump of silicon. After completion of the solidification, the end portion of the lump of silicon is cut off so as to remove the heavy metals. In this manner, a high-purity silicon lump is obtained.

In the above-described embodiment, the raw material supply apparatus 2 is a vibratory parts feeder. However, other types of mechanisms can be used for the raw material supply apparatus 2, such as a combination of a hopper and a screw feeder, a combination of a hopper and a gate mechanism, a combination of a container and a manipulator, or a combination of a container and a conveyer.

A refining method according to the present invention can be applied to recycling of scrap silicon for manufacturing high-purity silicon from scrap silicon which contains impurity elements and which is produced during the manufacture of silicon products such as silicon wafers.

What is claimed is:

1. A refining method for scrap silicon using an electron beam comprising:
   (a) a step of selectively preparing lumps of n-type scrap silicon containing a single specific impurity element as a dopant by purchasing lumps of scrap silicon, measuring the electrical resistivity of the purchased lumps of scrap silicon, and selecting from the purchased lumps of scrap silicon lumps of n-type scrap silicon containing only the single specific impurity element as a dopant based on the measured electrical resistivity;
   (b) a step of crushing the prepared lumps of scrap silicon;
   (c) a step of placing the crushed silicon into a vacuum vessel;
   (d) a step of irradiating the crushed silicon which was placed into the vacuum vessel with an electron beam to melt it and vaporize at least a portion of the impurity element, and
   (e) a step of solidifying the resulting molten silicon.

2. A refining method for scrap silicon as claimed in claim 1, wherein the impurity element is phosphorus, arsenic, or antimony.

3. A refining method for scrap silicon as claimed in claim 1, including a step of measuring the electrical resistivity of the silicon lumps obtained in the solidification step and changing refining conditions if the measured electrical resistivity of the silicon lumps obtained in the solidification step indicates the presence of an impurity element other than the specific impurity element.

4. A refining method for scrap silicon using an electron beam comprising:
   specifying a single one of antimony, arsenic, and phosphorus as an impurity element to be removed from scrap silicon;
   measuring the electrical resistivity of a plurality of lumps of n-type scrap silicon;
   selecting out of the plurality of lumps only lumps having an electrical resistivity corresponding to the presence of the specified impurity element as a dopant;
   crushing the selected lumps to obtain crushed silicon;
   irradiating the crushed silicon while inside a vacuum vessel with an electron beam to melt the crushed silicon and vaporize at least a portion of the specified impurity element; and
   solidifying the molten silicon obtained by irradiation to obtain solidified silicon.

5. A refining method for scrap silicon as claimed in claim 4 including:
   measuring the electrical resistivity of the solidified silicon; and
   changing refining conditions if the electrical resistivity of the solidified silicon is below a prescribed value so as to vaporize another impurity element other than the specified impurity element.

6. A refining method for scrap silicon as claimed in claim 4 including:
   selecting lumps of scrap silicon having a resistivity of less than 5 milliohm-cm when the specified impurity element is arsenic;
   selecting lumps of scrap silicon having a resistivity of 5 milliohm-cm to 30 milliohm-cm when the specified impurity element is antimony; and
   selecting lumps of scrap silicon having a resistivity of 0.1 ohm-cm to 1 ohm-cm when the specified impurity element is phosphorus.

* * * * *

UNITED STATES PATENT AND TRADEMARK OFFICE
CERTIFICATE OF CORRECTION

| | |
|---|---|
| PATENT NO. | : 7,632,329 B2 |
| APPLICATION NO. | : 11/142679 |
| DATED | : December 15, 2009 |
| INVENTOR(S) | : Yamauchi et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 926 days.

Signed and Sealed this

Second Day of November, 2010

David J. Kappos
*Director of the United States Patent and Trademark Office*